(12) United States Patent
Chen et al.

(10) Patent No.: US 10,990,871 B2
(45) Date of Patent: Apr. 27, 2021

(54) CONTACT SWITCH, CONTACT SWITCH SYSTEM, AND INTERACTIVE BUILDING BLOCK SYSTEM CARRYING THE CONTACT SWITCH

(71) Applicants: National Taiwan University, Taipei (TW); MEDIATEK INC., Hsin-Chu (TW)

(72) Inventors: Bing-Yu Chen, Taipei (TW); Meng-Ju Hsieh, Taipei (TW); Rong-Hao Liang, Taipei (TW); Da-Yuan Huang, Taipei (TW); Jheng-You Ke, Taipei (TW)

(73) Assignees: National Taiwan University, Taipei (TW); Mediatek Inc., Hsin-Chu (TW)

( * ) Notice: Subject to any disclaimer, the term of this patent is extended or adjusted under 35 U.S.C. 154(b) by 169 days.

(21) Appl. No.: 16/367,877

(22) Filed: Mar. 28, 2019

(65) Prior Publication Data

US 2020/0242441 A1 Jul. 30, 2020

(30) Foreign Application Priority Data

Jan. 29, 2019 (TW) .................................. 108103299

(51) Int. Cl.
*H01Q 1/22* (2006.01)
*G06K 19/077* (2006.01)
(Continued)

(52) U.S. Cl.
CPC . *G06K 19/07749* (2013.01); *G06K 19/07345* (2013.01); *H01Q 1/241* (2013.01)

(58) Field of Classification Search
CPC ............................................... G06K 19/07749
See application file for complete search history.

(56) References Cited

U.S. PATENT DOCUMENTS 7,265,675 B1 * 9/2007 Carrender .......... G06K 7/10346
340/10.1
2016/0064816 A1 * 3/2016 Preradovic ........... H01Q 21/205
455/562.1
(Continued)

OTHER PUBLICATIONS

Hsieh et al., RFIBricks: Interactive Building Blocks Based on RFID, ACM SIGCHI Conference on Human Factors, Apr. 21-26, 2018, Montreal, QC, Canada, 10 pages.

*Primary Examiner* — Joseph H Feild
*Assistant Examiner* — Pameshanand Mahase
(74) *Attorney, Agent, or Firm* — Muncy, Geissler, Olds & Lowe, P.C.

(57) ABSTRACT

A contact switch, contact switch system, and interactive building block system carrying the contact switch based on UHF RFID technology for detecting mutual contact events are provided. The contact switch system includes a plurality of contact switches each including a chip and an antenna not connected to the chip. When the contact switch is in contact with another contact switch, the chip is connected to another antenna of the another contact switch and the antenna is connected to another chip of the another contact switch. The chip receives and converts a radio wave from the another antenna into power, and the power converts identifying information of the chip into a radio wave, which is sent to a reader. When the reader reads two encoded identifying information at the same time, whether the two contact switches are in contact with each other is determined by the contact switch system.

20 Claims, 12 Drawing Sheets

(51) Int. Cl.
*H01Q 1/24* (2006.01)
*G06K 19/073* (2006.01)

(56) References Cited

U.S. PATENT DOCUMENTS

2016/0084935 A1* 3/2016 Bellows .................... G01S 5/18
                                                 367/137
2017/0077599 A1* 3/2017 Sayama ................... H01Q 1/48
2017/0373909 A1* 12/2017 Hermando .......... H04L 27/2665

* cited by examiner

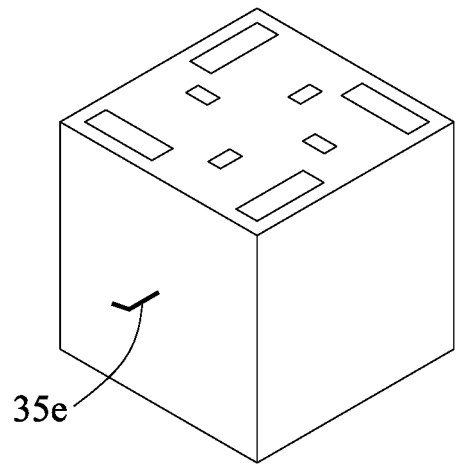 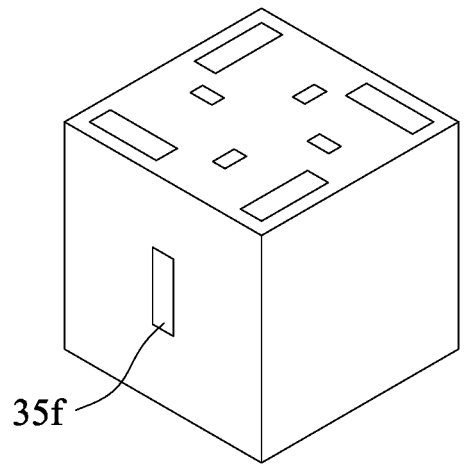
FIG. 10E    FIG. 10F
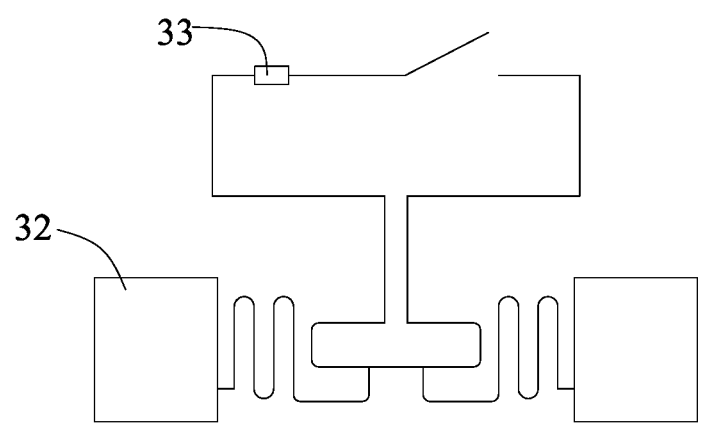
FIG. 10G

CONTACT SWITCH, CONTACT SWITCH SYSTEM, AND INTERACTIVE BUILDING BLOCK SYSTEM CARRYING THE CONTACT SWITCH

BACKGROUND

1. Technical Field

The present disclosure relates to wireless sensing techniques, and, more particularly, to a contact switch, a contact switch system and an interactive building block system carrying the contact switch for sensing and identifying based on a radio frequency.

2. Description of the Prior Art

A tangible user interface (TUI) imparts tangible entity to intangible digital information. Therefore, a user is allowed to interact with digital information through a tangible environment.

A tangible user interface can be realized by a physical building block system. A user can operate tangible building blocks to interact with a computer program or complete a digital product. For instance, children can play intelligent building block toys, which can generate various sound and light effects based on the operation direction or combination of the building blocks.

In general, a physical building block system can be categorized into an active building block system and a passive building block system. The active building block system has electronic circuits and transducers embedded therein to detect the building blocks combined by a user. Although the physical connection among the building blocks is reliable, it is not convenient to charge the embedded electronic circuits and electronic parts and replace batteries. The active building block system is hard to scalable. The passive building block system, though simplifying the design of the electronic parts, requires lots of calibrations or complicated algorithms since it relies on computer vision tracking, capacitive tracking or magnetic tracking techniques to track the combination of the building blocks.

Therefore, how to provide a building block system that does not have the problems of the active or passive building block system is becoming an urgent issue in the art.

SUMMARY

In order to achieve the above-mentioned objectives, the present disclosure provides a contact switch, comprising: a chip having identifying information and connected to another antenna of another contact switch when the contact switch is in contact with the another contact switch, the chip receiving power and outputting the identifying information of the chip via the another antenna; and an antenna connected to another chip of the another contact switch when the contact switch is in contact with the another contact switch, the another chip receiving power and outputting another identifying information of the another chip via the antenna.

In order to achieve the above-mentioned objectives, the present disclosure further provides a contact switch system, comprising: a first contact switch including a first antenna and a first chip having first identifying information; a second contact switch including a second antenna and a second chip having second identifying information; a reader configured for reading the first identifying information and the second identifying information; and a processor configured for determining whether the first contact switch is in contact with the second contact switch when the reader reads the first identifying information and the second identifying information.

In an embodiment, the first contact switch further comprises a plurality of first magnetic connectors connected to the first antenna and the first chip, respectively, and the second contact switch further comprises a plurality of second magnetic connectors connected to the second antenna and the second chip, respectively. The stacking between the first building block and the second building block causes the plurality of first magnetic connectors to be in contact with the plurality of the second magnetic connectors, causes the first chip to be connected to the second antenna, and causes the second chip to be connected to the first antenna.

In an embodiment, when the first contact switch is in contact with the second contact switch, the first chip is connected to the second antenna, receives power and outputs the first identifying information via the second antenna, and the second chip is connected to the first antenna, receives power and outputs the second identifying information via the first antenna. In another embodiment, the first chip and the second antenna pair and constitute a radio frequency identification tag, and the second chip and the first antenna pair and constitute another radio frequency identification tag. In another embodiment, the first identifying information is identification identifying information of the first contact switch, and the second identifying information is spatial identifying information for positioning the first contact switch; alternatively, the first identifying information is spatial identifying information for positioning the second contact switch, and the second identifying information is identification identifying information of the second contact switch.

In order to achieve the above-mentioned objectives, the present disclosure provides an interactive building block system, comprising: a first building block; a first contact switch disposed on the first building block and having identification identifying information; a second building block; and a second contact switch disposed on the second building block and having spatial identifying information, wherein when the second building block is stacked on the first building block, the first contact switch is connected to the second contact switch and outputs the identification identifying information and the spatial identifying information of the first building block.

In an embodiment, the first contact switch includes a first antenna and a first chip having the identification identifying information, and the second contact switch includes a second antenna and a second chip having the spatial identifying information; and when the first building block is stacked on the second building block, the first chip is connected to the second antenna, receives power and outputs the identification identifying information via the second antenna to identify the first building block, and the second chip is connected to the first antenna, receives power and outputs the spatial identifying information via the first antenna to position the first building block. In another embodiment, the first contact switch further includes a plurality of first magnetic connectors connected to the first antenna and the first chip, respectively, and the second contact switch includes a plurality of second magnetic connectors connected to the second antenna and the second chip, respectively, and the stacking between the first building block and the second building block causes the plurality of first magnetic connectors to be in contact with the plurality of second magnetic connectors, causes the first chip to be connected to the second antenna, and causes the second chip to be connected to the first antenna.

In an embodiment, a plurality of the second building blocks may be arranged as a substrate, each of the second building blocks having the second contact switch disposed thereon, and spatial identifying information output by each of the second contact switches includes 2D or 3D position information, thereby positioning a position of the first building block on the substrate. In another embodiment, a plurality of the second building blocks may be arranged as a substrate, each of the second building blocks having a plurality of the second contact switches disposed thereon, and spatial identifying information output by each of the second contact switches includes orientation information and 2D or 3D position information, thereby positioning a position and an orientation of the first building block on the substrate. In an embodiment, the interactive building block system further comprises a third contact switch disposed on the first building block, and when another building block having a fourth contact switch disposed is stacked on the first building block, the third contact switch is connected to the fourth contact switch, and outputs spatial identifying information and identification identifying information of the another building block.

In an embodiment, at least one of the first contact switch and the second contact switch further comprises an electronic component. In another embodiment, the electronic component is a button, a switching key, a switch, a rotary encoder, a tilt switch or a reed switch.

In an embodiment, the interactive building block system further comprises: a reader configured for reading spatial identifying information and identification identifying information of the first building block; and a processor configured for updating system geometric information based on identification identifying information and spatial identifying information of the first building block. In another embodiment, the processor displays on a display a corresponding picture based on the system geometric information.

Therefore, the present disclosure provides a contact switch detecting based on ultrahigh frequency (UHF) radio-frequency identification (RFID), a contact switch system, and an interactive building block system carrying the contact switch. An RFID tag is divided into an antenna and a chip, which are coupled to magnetic connectors, respectively. When the antenna and the chip are connected via the magnetic connectors, an interactive event having identifying information is sent to the reader. In an embodiment, when a building block is stacked on another building block, the interactive building block system according to the present disclosure may analyze the stacking order and stacking orientation, determine 3D geometric components on a 2D substrate, and combine with an electrical sensor to sense a user's input. Since the contact switch and the contact switch system according to the present disclosure need not be calibrated, and batteries need not be mounted onto the building blocks when the contact switch is applied to the interactive building block system, and a great amount of the contact switches may be deployed and maintained directly. Therefore, the contact switch based on RFID, the contact switch system, and the interactive building block system carrying the contact switch according to the present disclosure may determine the identity of a passive building block and the constituted 3D geometric structure, realize a stacked token+constraint interaction on a table, and track components in hands.

BRIEF DESCRIPTION OF THE DRAWINGS

The disclosure can be more fully understood by reading the following detailed description of the embodiments, with reference made to the accompanying drawings, wherein:

FIGS. 10A to 10G are schematic diagrams of a chip, an antenna and an electronic part according to the present disclosure.

DETAILED DESCRIPTION

The following illustrative embodiments are provided to illustrate the disclosure of the present disclosure, these and other advantages and effects can be apparently understood by those in the art after reading the disclosure of this specification. The present disclosure can also be performed or applied by other different embodiments. The details of the specification may be on the basis of different points and applications, and numerous modifications and variations can be devised without departing from the spirit of the present disclosure.

Figure 11:
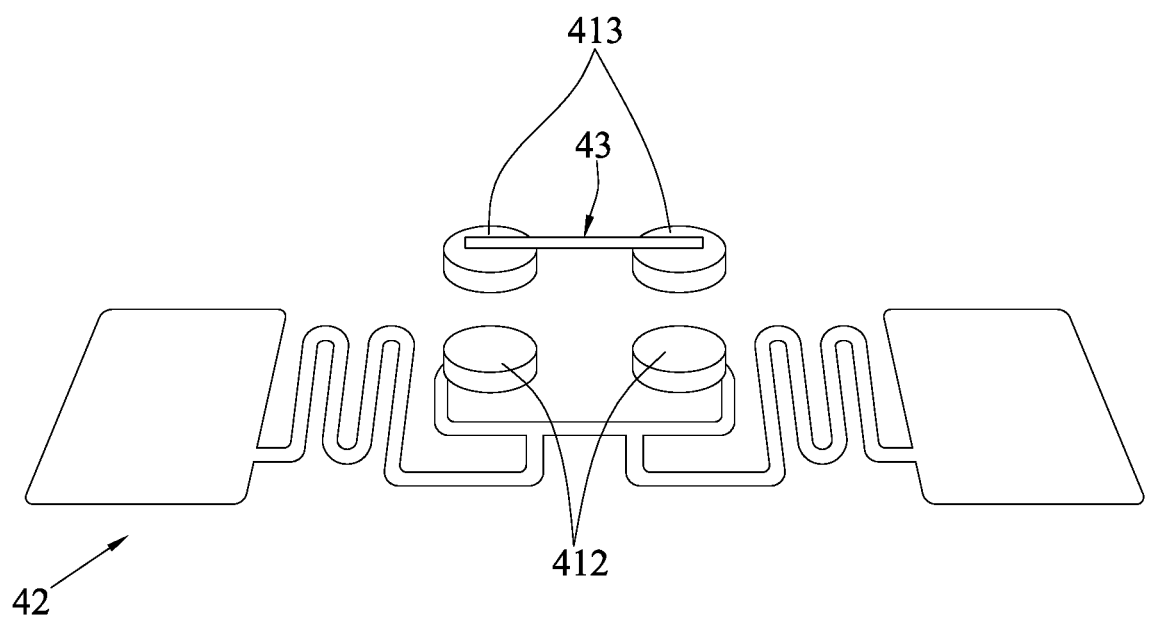
FIG. 11 is a schematic diagram of a contact switch according to the present disclosure.

Refer to FIG. 11, which is a schematic diagram of a contact switch according to the present disclosure. The contact switch comprises an antenna 42 and a chip 43. When the contact switch is in contact with another contact switch, the chip 43 is connected to another antenna of the another contact switch, receives power and outputs identifying information of the chip 43 via the another antenna, and another chip of the another contact switch is connected to the antenna 42, receives power and outputs another identifying information of the another chip via the antenna 42. The antenna 42 and the another chip are formed by dividing an identical UHF RFID tag, and the chip 43 and the another antenna are formed by dividing another identical UHF RFID tag. When the two contact switches are in contact with each other, the antenna 42 is connected to the another chip, and the antenna 43 is connected to the another antenna. Therefore, the identifying information of the chip 43 and the another identifying information of the another chip are output outward to the reader by the another antenna and the antenna 42, respectively. When the reader receives the identifying information and the another identifying information at the same time, the processor determines that the two contact switches are in contact with each other.

In an embodiment, the antenna 42 can be disposed with magnetic connectors 412, and the chip 43 can be disposed with magnetic connectors 413 that have opposite polarity to the magnetic connectors 412. The magnetic connectors 412 assist the connection of the antenna 42 with the another chip, and the magnetic connectors 413 assist the connection of the chip 43 with the another antenna.

In an embodiment, the contact switch system of the present disclosure comprises a first contact switch, a second contact switch, a reader and a processor. UHF RFID techniques can detect whether the first contact switch is in contact with the second contact switch. For instance, the first contact switch is mounted on a door and the second contact switch is mounted to a door frame, such that whether the door is open or close can be detected and determined. For another instance, the first contact switch can be disposed on an object, and the second contact switch can be disposed on a table, such that whether the object leaves the table can be determined.

In an embodiment, the second identifying information of the second chip in the second contact switch is spatial identifying information for positioning the first contact switch which is in contact with the second contact switch, and the first identifying information of the first chip in the first contact switch is identification identifying information of itself. Please refer to a building block 1 in the following paragraphs for the embodiment.

In another embodiment, the first identifying information of the first chip in the first contact switch is identification identifying information of itself, and the second identifying information of the second chip in the second contact switch is spatial identifying information for positioning the first contact switch that is in contact with the second contact switch. Please refer to a building block 2 in the following paragraphs for the embodiment.

In yet another embodiment, the first identifying information of the first chip in the first contact switch is identification identifying information of itself, and the third identifying information of the third contact switch is spatial identifying information for positioning a fourth contact switch. Please refer to a building block 3 in the following paragraphs for the embodiment.

Figure 1:
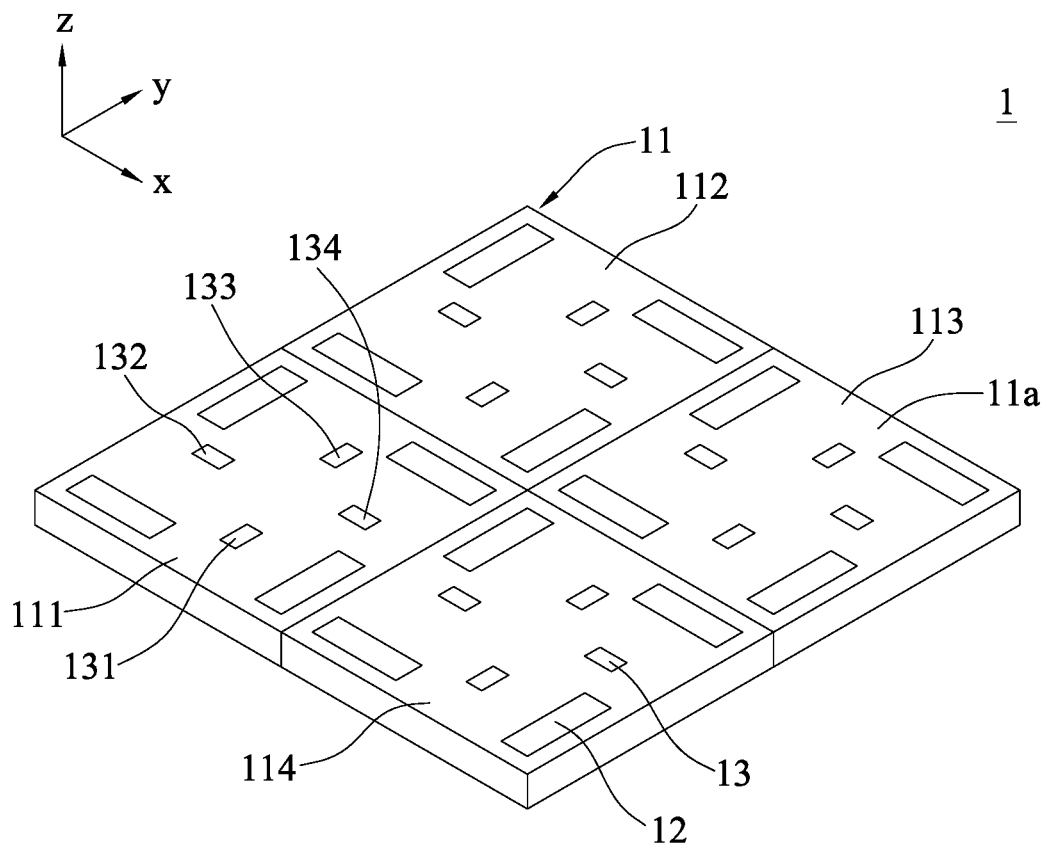
FIG. 1 is a schematic diagram of a building block of an embodiment according to the present disclosure.
Figure 2:
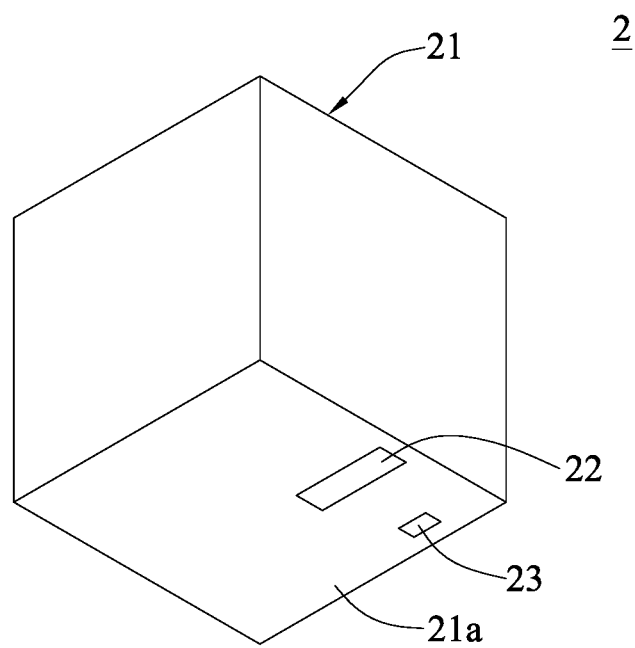
FIG. 2 is a schematic diagram of a building block of another embodiment according to the present disclosure.
Figure 3:
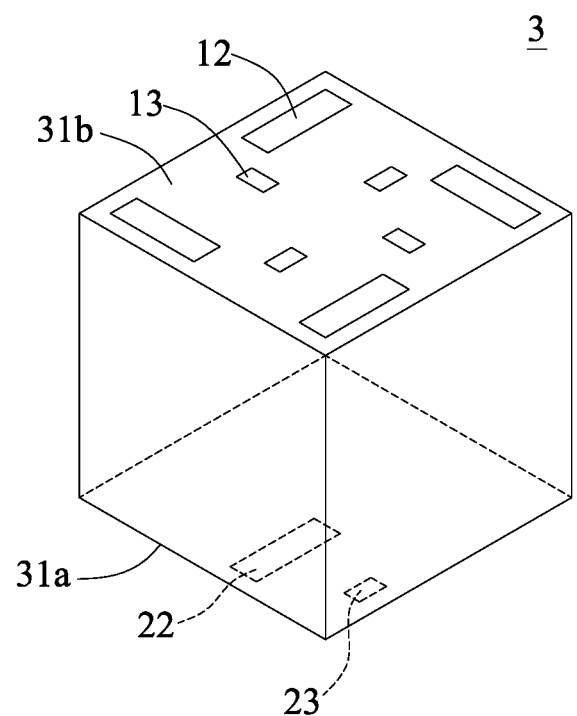
FIG. 3 is a schematic diagram of a building block of yet another embodiment according to the present disclosure.

Please refer to FIGS. 1 to 3. The present disclosure provides a plurality of building blocks 1, 2 and 3.

Refer to FIG. 1. The building block 1 comprises a body 11 having a surface 11a. A second contact switch having an antenna 12 and a chip 13 is disposed on the surface 11a. The building block 1 can be considered as a substrate constituted by arranging a plurality of small building blocks (referred to as units hereinafter), each of which has at least one second contact switch disposed.

The antenna 12 is connected to a first chip of a first contact switch of another building block that is stacked on the building block 1. The identification identifying information in the first chip is transmitted outward via the antenna 12 to, for example, a reader (not shown in this figure, referring to FIG. 5). The chip 13 has spatial identifying information for positioning and stacking another building block on the building block 1. When the chip 13 is connected with the first antenna in the first contact switch, the spatial identifying information in the chip 13 is transmitted via the first antenna outward to, for example, a reader. The chip 13 further receives power via the first antenna from the reader.

As shown in FIG. 1, the building block 1 is a substrate having a plurality of units 111-114, each of which has a plurality of antennas 12 and chips 13 disposed thereon. The antennas 12 are the same as the chips 13 in number. Chips in different units comprise different spatial identifying information. In an embodiment, the chips 131-134 on the unit 111 comprise spatial identifying information that is x, y, z=1, 1, 1; the chip 13 on the unit 112 comprises spatial identifying information that is x, y, z=1, 2, 1; the chip 13 on the unit 113 comprises spatial identifying information that is x, y, z=2, 2, 1; and the chip 13 on the unit 114 comprises spatial identifying information that is x, y, z=2, 1, 1. Chips in the same unit comprise different spatial identifying information. Take the unit 111 as an example. The spatial identifying information contained in the chip 131 comprises position information and orientation information, i.e., x, y, z, theta=1, 1, 1, 0; the spatial identifying information contained in the chip 132 comprises position information and orientation information, i.e., x, y, z, theta=1, 1, 1, pi/2; the spatial identifying information contained in the chip 133 comprises position information and orientation information, i.e., x, y, z, theta=1, 1, 1, pi; and the spatial identifying information contained in the chip 134 comprises message information and orientation information, i.e., x, y, z, theta=1, 1, 1, −pi/2. Each of the units 111-114 of the building block 1 may be disposed with only one contact switch, i.e., one antenna 12 and one chip 13. The spatial identifying information in the chip 13 may comprise position information only.

When another building block is stacked on the building block 1, the antenna 12 may output identification identifying information of the another building block, and the spatial identifying information in the chip 13 for positioning the another building block can be transmitted outward via the first antenna of the first contact switch on the another building block. Therefore, the reader can receive two information signals at the same time, and get to know where the another building block is on the building block 1.

Refer to FIG. 2. The building block 2 comprises a body 21 having a surface 21a. A first contact switch having an antenna 22 and a chip 23 is disposed on the surface 21a. The chip 23 has identification identifying information of the building block 2 itself. When the building block 2 is stacked on another building block, a second antenna of a second contact switch disposed on the another building block transmits the identification identifying information of the building block 2 outward to, for example, a reader (not shown in this figure, referring to FIG. 5), and receives power provided by the reader. The antenna 22 may receive spatial identifying information from the second chip of the second contact switch on the another building block for positioning the building block 2 and transmit the spatial identifying information to the reader. Therefore, the reader can receive two information signals at the same time, and get to know the position and orientation of the building block 2. The building block 2 can be, but not limited to cubic, as shown in FIG. 2. The building block can comprise one or more lateral surfaces connected to the surface 21a.

Refer to FIG. 3. The same as the surface 21a of the building block 2, a surface 31a of the building block 3 also has disposed thereon a first contact switch having an antenna 22 and a chip 23. The same as the surface 11a of the building block 1, a surface 31b (opposing the surface 31a) of the building block 3 has disposed thereon a third contact switch having an antenna 12 and a chip 13. FIG. 3 shows that a plurality of antennas 12 and chips 13 are disposed on the surface 31b of the building block 3. In another embodiment, only one antenna 12 and one chip 13 are disposed on the surface 31b of the building block 3. The chip 23 (can be considered as a first chip) is disposed on the surface 31a and has identification identifying information. The first chip outputs the identification identifying information via a second antenna disposed in the second contact switch. The antenna 22 (can be considered as a first antenna) is disposed on the surface 31a and outputs spatial identifying information from the second chip in the second contact switch for positioning the building block 3. The chip 13 (can be considered as a third chip) is disposed on the surface 31b and has spatial identifying information. When yet another building block is stacked on the building block 3, the third chip outputs spatial identifying information via a fourth antenna of a fourth contact switch on the yet another building block to position the yet another building block. The antenna 12 (can be considered as a third antenna) is disposed on the surface 31b and outputs identification identifying information of a fourth chip of a fourth contact switch on the yet another building block. The building block 3 can be, but not limited to be cubic, as shown in FIG. 3. The building block may include one or more lateral surfaces connected to the surfaces 31a and 31b.

Figure 4A:
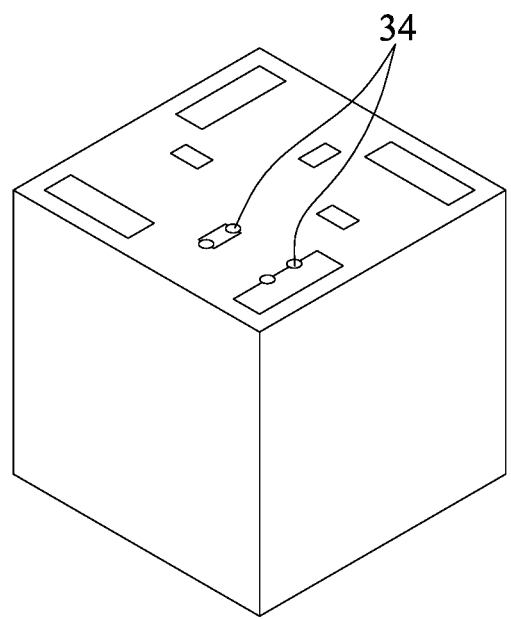
FIGS. 4A and 4B are schematic diagrams of an antenna, a chip, and magnetic connectors mounted onto a building block according to the present disclosure.
Figure 4B:
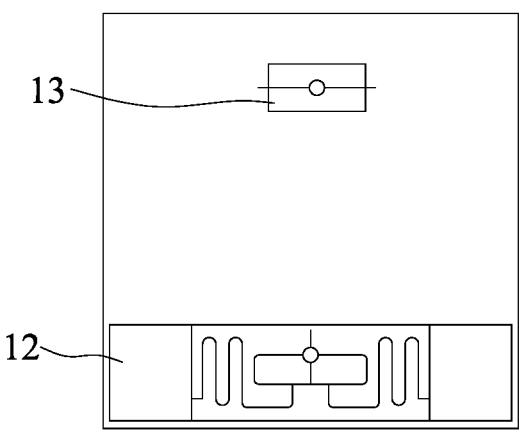

FIGS. 4A and 4B show the arrangement of chips and antennas on a building block surface. As shown in FIG. 4A, four antennas 12 and four chips 13 on the building block surface are connected to four magnetic connectors 34, such as magnets, respectively. The magnetic connectors 34 assist the electrical connection of the antennas 12 with another chips, and assist the electrical connection of the chips 13 with another antennas. Similarly, the chip 13 and the antenna 12 of the building block 1 are connected to the magnetic connectors 34, respectively. The antenna 22 and the chip 33 of the building block 2 are connected to the magnetic connectors 34, respectively. The present disclosure neither limits the number of the magnetic connectors, nor limits the structure of the chip or the antenna.

In an embodiment, eight, or any number of, RFID tags are obtained, and chips and antennas in the RFID tags are divided. The chip and antenna of the different tag are adhered to an identical adhesive layer, as shown in FIG. 4B, and four adhesive layers are obtained. The four adhesive layers are adhered to a building block surface along the edge of a surface, and four antennas and four chips are formed on the building block surface. An adhesive layer on which all the magnets are arranged orderly is adhered to the building block surface. With the use of the adhesive layers having the chips and the antennas adhered thereon and the adhesive layer having the magnets arranged ordered thereon, the fabrication speed is increased and the magnets can be aligned with the chips or the antennas. The RFID tags can be UHF RFID tags, which have a long operation distance and a high data transmission rate. In an embodiment, the building block is, but not limited to, cubic, cuboid, cylindrical, a cone, a circular platform, a triangular pillar, a triangular prism, a hexagonal pillar, a hexagonal prism, or a polyhedron.

Figure 5:
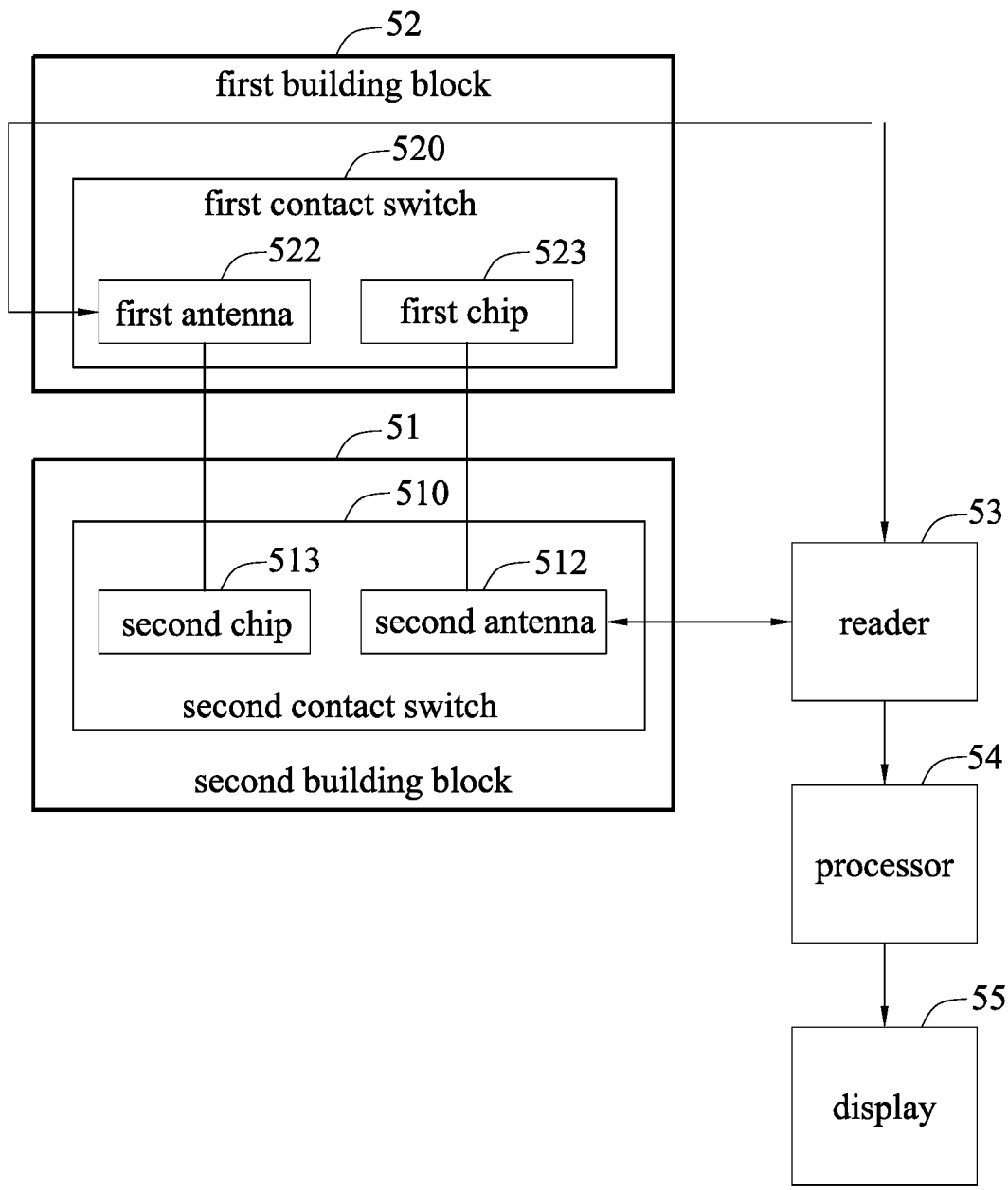
FIG. 5 is a block schematic diagram of an interactive building block system according to the present disclosure.

Refer to FIG. 5. An interactive building block system according to the present disclosure comprises a second building block 51, a first building block 52, a reader 53, a processor 54, and a display 55. On a surface of the second building block 51 a second contact switch 510 having a second antenna 512 and a second chip 513 is disposed, and the second chip 513 has spatial identifying information for positioning the first building block 52. On a surface of the first building block 52 a first contact switch 520 having a first antenna 522 and a first chip 523 is disposed, and the first chip 523 has identification identifying information of the first building block 52. The first chip 523 is connected to the second antenna 512, for the second antenna 512 to transmit the identification identifying information outward. The second chip 513 is connected to the first antenna 522, for the first antenna 522 to transmit the spatial identifying information outward. The reader 53 can read the identification identifying information in the first chip 523 and the spatial identifying information in the second chip 513 via the second antenna 512 and the first antenna 522, respectively, and transmit power to the first chip 523 and the second chip 513 via the second antenna 512 and the first antenna 522, respectively. The processor 54 can update system geometric information based on the identification identifying information and the spatial identifying information of the first building block 52, and display on the display 55 a corresponding picture based on the system geometric information.

The first chip 523 and the second antenna 512 pair and constitute a radio frequency identification tag for identifying. The second chip 513 and the first antenna 522 pair and constitute a radio frequency identification tag for positioning. In an embodiment, a chip and an antenna of a radio frequency identification tag is cut off and adhered to two different building blocks, to act as the first chip 523 and the second antenna 512, respectively, and a chip and an antenna of another radio frequency identification tag is cut off and adhered to two different building blocks, to act as the second chip 513 and the first antenna 522, respectively. When two building blocks are stacked on each other and the paired antennas and chips are electrically connected to each other, the chip is actuated to transmit information therein (the identification identifying information or the spatial identifying information) outward via the antenna electrically connected thereto.

The second contact switch 510 may comprise second magnets (not shown in this figure) connected to the second chip 513 and the second antenna 512, respectively. The first contact switch 520 may comprise first magnets (not shown in this figure) connected to the first chip 523 and the first antenna 522, respectively. The first magnets and the second magnets have opposite polarities, which facilitates the electrical connection of the first chip 523 with the second antenna 512 and the electrical connection of the second chip 513 with the first antenna 522 when the second building block 51 and the first building block 52 are stacked on each other.

Figure 6:
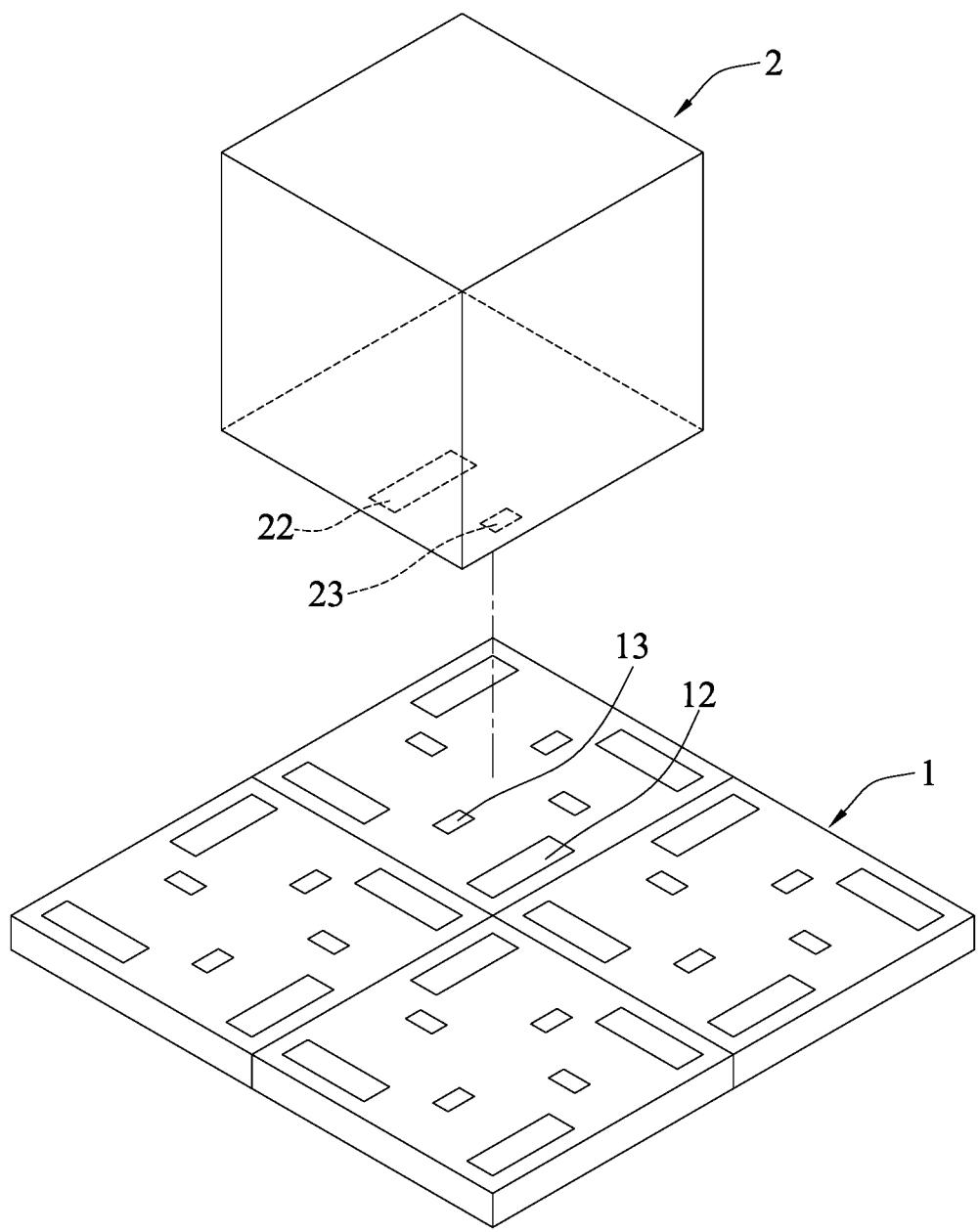
FIG. 6 is a schematic diagram of an interactive building block system of an embodiment according to the present disclosure.

An interactive building block system of an embodiment according to the present disclosure is described in this paragraph. Refer to FIG. 6. When the building block 2 (a bulk) is not stacked on the building block 1 (a plate), the reader of the system will not receive any signal. When the building block 2 is stacked on the building block 1 and the chip 23 and the antenna 22 are in electrical contact with the antenna 12 and the chip 13, respectively, the identification identifying information (e.g., #47 in the building block 2) in the chip 23 is transmitted via the antenna 12 to the reader, and the spatial identifying information (e.g., the coordinate and oriental angle of the building block 2 on the building block 1: x=2, y=2, z=1, theta=pi) in the chip 13 can be transmitted via the antenna 22 to the reader. Therefore, the reader can receive two signals at the same time, i.e., the identification identifying information and the spatial identifying information of the building block 2, and the stacking manner of the building block 2 on the building block 1 can be determined. The interactive building block system according to the present disclosure can thus identify the identification of a building block, construct the geometry of a building block stack, and analyze the stacking order and orientation of the building block.

Figure 7:
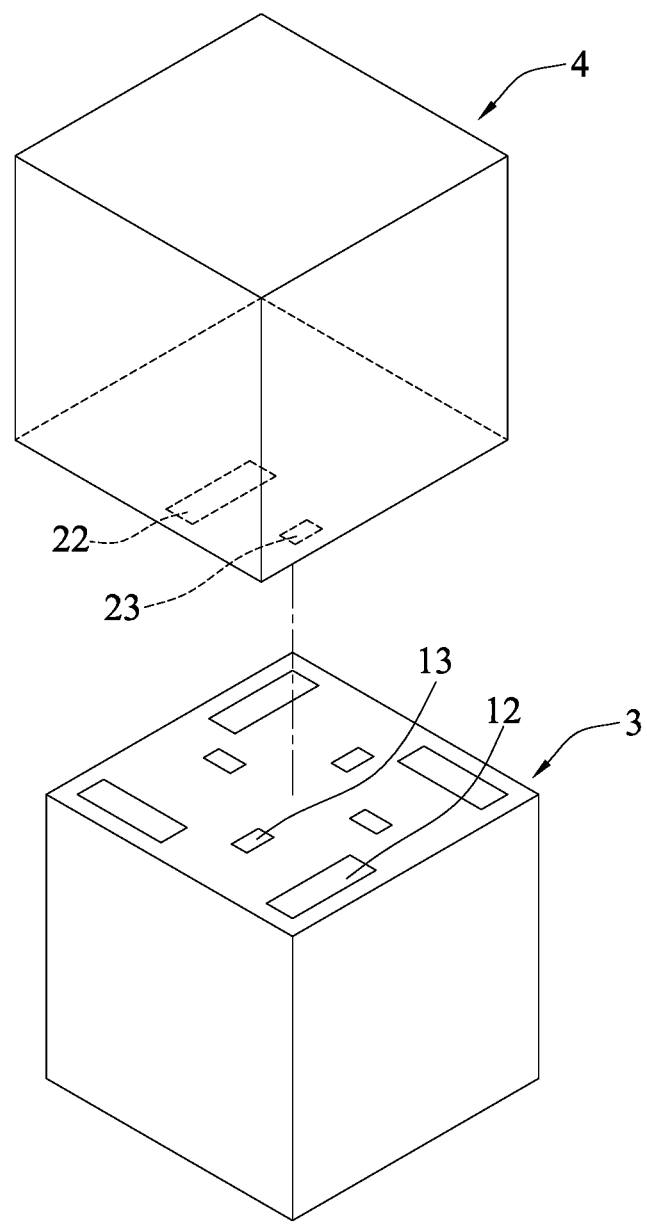
FIG. 7 is a schematic diagram of an interactive building block system of another embodiment according to the present disclosure.

An interactive building block system of another embodiment according to the present disclosure is described in this paragraph. Refer to FIG. 7. When the building block 4 (a bulk) is not stacked on the building block 3 (a bulk), the reader of the system will not receive any signal. When the building block 4 is stacked on the building block 3 and the chip 23 and the antenna 22 are in electrical contact with the antenna 12 and the chip 13, respectively, the identification identifying information (e.g., #48 of the building block 2) in the chip 23 can be transmitted via the antenna 12 to the reader, and the spatial identifying information (e.g., the coordinate and oriental angle of the building block 4 on the building block 3: x=2, y=2, z=2, theta=0) in the chip 13 can be transmitted via the antenna 22 to the reader. Therefore, the reader can receive two signals at the same time. i.e., the identification identifying information and the spatial identifying information of the building block 4, and the stacking manner of the building block 4 on the building block 3 can be determined. Therefore, the interactive building block system according to the present disclosure can analyze the stacking order and orientation of the building block, and track the stacking manner of the building block in hands.

Figure 8A:
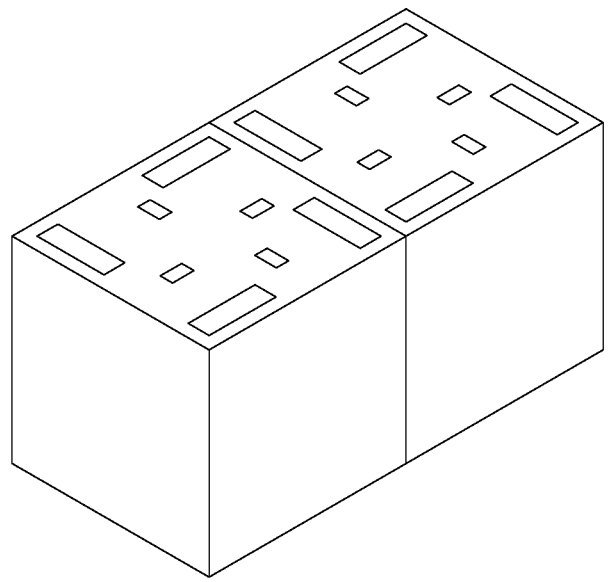
FIGS. 8A, 8B, 9A and 9B are schematic diagrams of building block combinations according to the present disclosure.
Figure 8B:
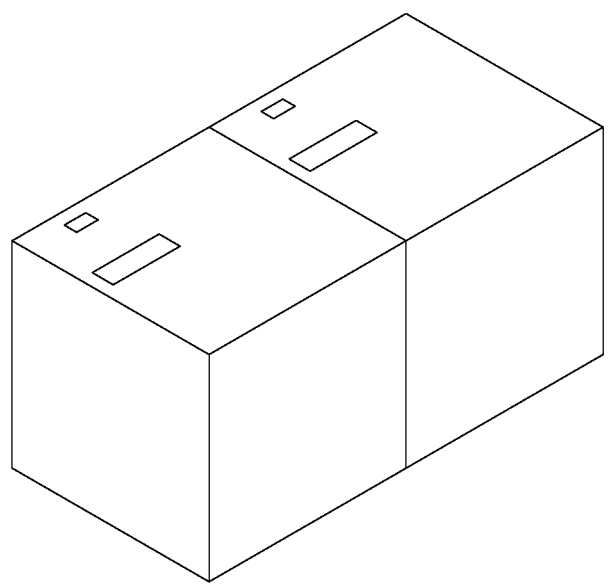
Figure 9A:
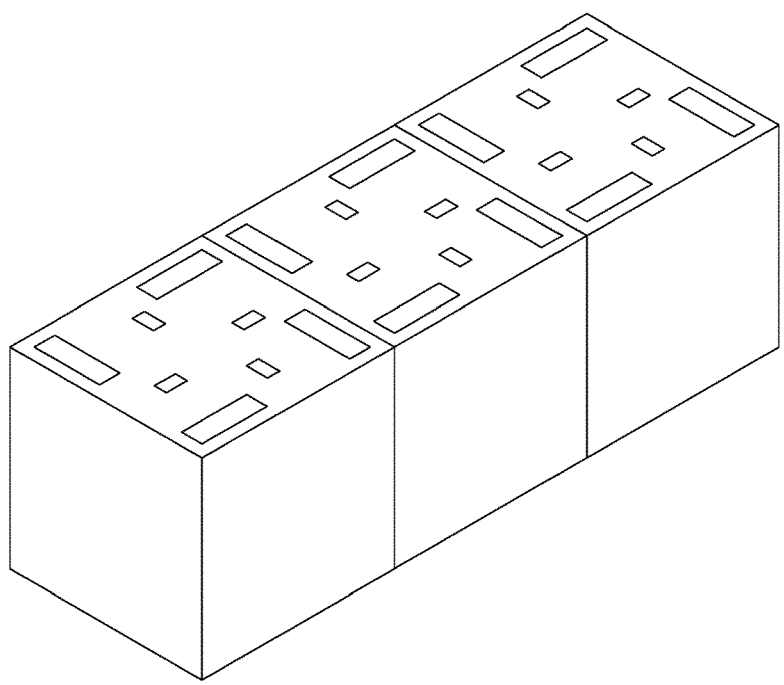
Figure 9B:
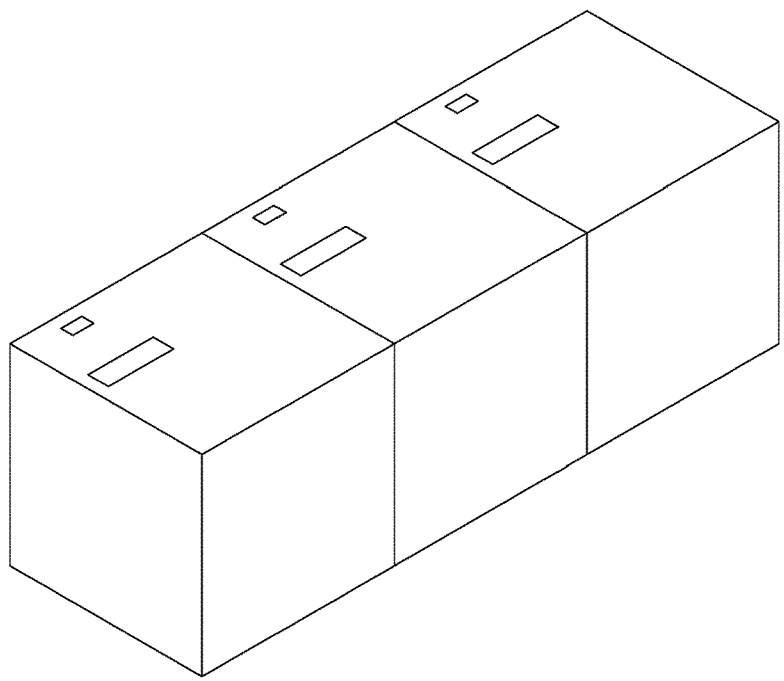
Figure 10A:
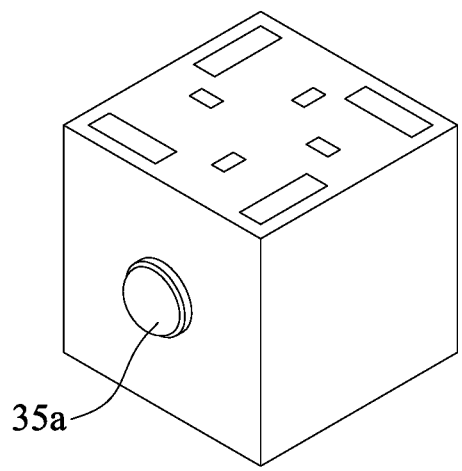
Figure 10B:
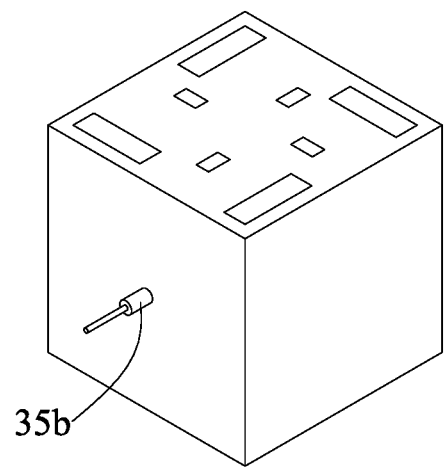
Figure 10C:
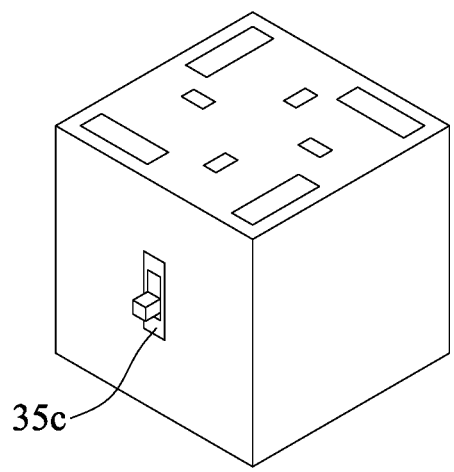
Figure 10D:
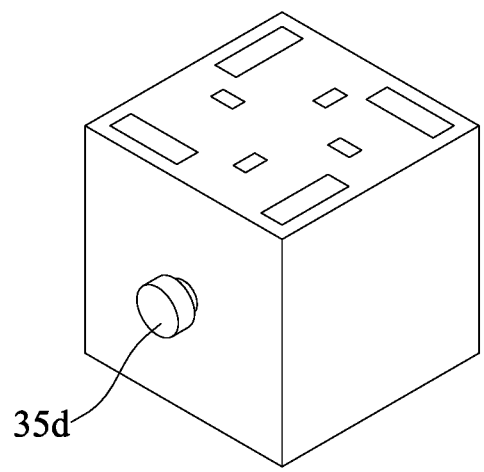

FIGS. 8A, 8B, 9A and 9B show the combinations of building blocks. FIG. 8B is the reverse of FIG. 8A. FIGS. 8A and 8B show a 1×2 combination of building blocks. FIG. 9B is the reverse of FIG. 9A. FIGS. 9A and 9B are 1×3 combination of building blocks.

Refer to FIGS. 10A to 10G The present disclosure can cooperate with an electrical sensor to sense a user's input. In an embodiment, an electronic component, such as a button 35a, a switching key 35b, a switch 35c, a rotary encoder 35d, a tilt switch 35e or a reed switch 35f, is disposed in the contact switch and electrically connected to the chip and the antenna, for electrically connecting the antenna 32 with the chip 33 and sensing the pressing, rotation or tilting of a building block disposed with a contact switch.

The interactive building block system according to the present disclosure can be applied to a variety of technical fields. In an embodiment, a second building block in the shape of a plate and a plurality of first building blocks in the shape of a bulk are provided. As the first building blocks are stacked on the second building block at different stacking positions and stacking orientations, different pictures can be displayed (or projected) on a display, different first building blocks representing different patterns. Therefore, a user can operate the first building blocks to construct a virtual digital environment. In another embodiment, a second building block in the shape of a plate and a plurality of first building blocks in the shape of a bulk are provided. A plurality of users, as players, stack the first building blocks on the second building block based on game rules. Different first building blocks represent different game tools. If the same first building blocks are stacked together, the strength of the game tool can be enhanced. In yet another embodiment, the first building blocks can have an electronic component, as shown in FIGS. 10A to 10G. A user operates the electronic component to trigger the execution of the game tool, such as stacking first building blocks that represent a cannon and pressing a button to launch a bomb.

In an embodiment, a plurality of building blocks (e.g., the building blocks 1, 2, 3 or 4, or building blocks having an electronic component, with their shapes not limited) in the shape of a bulk are provided and have different functions. Building blocks having required functions can be combined based on the instructions of a computer program, and a button can be pressed to trigger a program event. Alternatively, a computer program can represent a virtual picture based on the stacked building blocks, and a button switch or a switching element operates to electrically connect chips and antennas in the building blocks, thereby triggering a program event. Therefore, the interactive building block system according to the present disclosure can realize a stacked token+constraint interaction on a table.

In sum, the present disclosure applies the chip and antenna in an RFID tag to a building block surface, and provides building blocks having a variety of shapes and functions. Therefore, the building blocks can be reliably combined and connected. The wireless transmission technique is used to simplify the use of electronic circuit design and electronic components, no need for the complicated tracking algorithms and the replacement of battery. The present disclosure also provides an interactive building block system that uses a plurality of building blocks, which can be applied to a variety of interactive interfaces between virtual and physical entities.

The foregoing descriptions of the detailed embodiments are only illustrated to disclose the features and functions of the present disclosure and not restrictive of the scope of the present disclosure. It should be understood to those in the art that all modifications and variations according to the spirit and principle in the disclosure of the present disclosure should fall within the scope of the appended claims.

What is claimed is:

1. A contact switch, comprising:
   a chip having identifying information and configured for receiving power and outputting the identifying information of the chip via another antenna of another contact switch when the contact switch is in contact with the another contact switch and the chip of the contact switch is in electrical connection to the another antenna of the another contact switch; and
   an antenna configured for another chip of the another contact switch receiving power and outputting another identifying information of the another chip via the antenna of the contact switch when the contact switch is in contact with the another contact switch and the antenna of the contact switch is in electrical connection to the another chip of the another contact switch.

2. The contact switch of claim 1, further comprising a plurality of magnetic connectors coupled to the antenna and the chip, respectively.

3. The contact switch of claim 1 being disposed on a building block.

4. A contact switch system, comprising:
   the contact switch of claim 1 being a first contact switch, the antenna being a first antenna, the chip being a first chip, and the identifying information being first identifying information;
   the another contact switch of claim 1 being a second contact switch, the another antenna being a second antenna, the another chip being a second chip, and the identifying information being having second identifying information;
   wherein when the first contact switch is in contact with the second contact switch, the first chip is connected to the second antenna, receives power and outputs the first identifying information via the second antenna, and the second chip is connected to the first antenna, receives power and outputs the second identifying information via the first antenna.

5. The contact switch system of claim 4, further comprising:
   a reader configured for reading the first identifying information and the second identifying information; and
   a processor configured for determining whether the first contact switch is in contact with the second contact switch when the reader reads the first identifying information and the second identifying information.

6. The contact switch system of claim 4, wherein the first contact switch further comprises a plurality of first magnetic connectors connected to the first antenna and the first chip, respectively, the second contact switch further comprises a plurality of second magnetic connectors connected to the second antenna and the second chip, respectively, and wherein contact between the first contact switch and the second contact switch causes the plurality of first magnetic connectors to be in contact with the plurality of the second magnetic connectors, causes the first chip to be connected to the second antenna, and causes the second chip to be connected to the first antenna.

7. The contact switch system of claim 4, wherein the first identifying information is one of identification identifying information of the first contact switch and spatial identifying information configured for positioning the first contact switch, and the second identifying information is another of identification identifying information of the first contact switch and spatial identifying information configured for positioning the first contact switch.

8. The contact switch system of claim 4, wherein the first chip and the second antenna pair and constitute a radio frequency identification tag, and the second chip and the first antenna pair and constitute another radio frequency identification tag.

9. An interactive building block system, comprising:
a first building block;
the contact switch of claim 1 being first contact switch disposed on the first building block and the identifying information being identification identifying information, the antenna is a first antenna and the chip is a first chip;
a second building block; and
the another contact switch of claim 1 being second contact switch disposed on the second building block and the another identifying information being spatial identifying information, the another antenna is a second antenna and the another chip is a second chip,
wherein when the first building block is stacked on the second building block, the first contact switch is connected to the second contact switch and outputs the identification identifying information and the spatial identifying information of the first building block.

10. The interactive building block system of claim 9, wherein when the first building block is stacked on the second building block, the first chip is connected to the second antenna, receives power and outputs the identification identifying information via the second antenna to identify the first building block, and the second chip is connected to the first antenna, receives power and outputs the spatial identifying information via the first antenna to position the first building block.

11. The interactive building block system of claim 9, wherein the first contact switch further comprises a plurality of first magnetic connectors connected to the first antenna and the first chip, respectively, the second contact switch further comprises a plurality of second magnetic connectors connected to the second antenna and the second chip, respectively, and wherein stacking between the first building block and the second building block causes the plurality of first magnetic connectors to be in contact with the plurality of the second magnetic connectors, causes the first chip to be connected to the second antenna, and causes the second chip to be connected to the first antenna.

12. The interactive building block system of claim 9, wherein the first chip and the second antenna pair and constitute a radio frequency identification tag for identification, and the second chip and the first antenna pair and constitute a radio frequency identification tag for positioning.

13. The interactive building block system of claim 9, wherein the second building block is plural and arranged as a substrate, each of the second building blocks has the second contact switch disposed thereon, and spatial identifying information output by each of the second contact switches comprises 2D or 3D position information, thereby positioning a position of the first building block on the substrate.

14. The interactive building block system of claim 9, wherein the second building block is plural and arranged as a substrate, each of the second building blocks has a plurality of the second contact switches disposed thereon, and spatial identifying information output by each of the second contact switches comprises orientation information and 2D or 3D position information, thereby positioning a position and an orientation of the first building block on the substrate.

15. The interactive building block system of claim 9, further comprising a third contact switch disposed on the first building block, wherein when another building block having a fourth contact switch disposed is stacked on the first building block, the third contact switch is connected to the fourth contact switch, thereby outputting spatial identifying information and identification identifying information of the another building block.

16. The interactive building block system of claim 9, wherein at least one of the first contact switch and the second contact switch further comprises an electronic component.

17. The interactive building block system of claim 16, wherein the electronic component is a button, a switching key, a switch, a rotary encoder, a tilt switch or a reed switch.

18. The interactive building block system of claim 9, wherein the identification identifying information and the spatial identifying information are transmitted outward at the same time.

19. The interactive building block system of claim 9, further comprising:
a reader configured for reading spatial identifying information and identification identifying information of the first building block; and
a processor configured for updating system geometric information based on identification identifying information and spatial identifying information of the first building block.

20. The interactive building block system of claim 19, wherein the processor displays a corresponding picture on a display based on the system geometric information.

* * * * *